(12) United States Patent
Sheynblat

(10) Patent No.: US 7,151,939 B2
(45) Date of Patent: Dec. 19, 2006

(54) METHOD, APPARATUS, AND MACHINE-READABLE MEDIUM FOR PROVIDING INDICATION OF LOCATION SERVICE AVAILABILITY AND THE QUALITY OF AVAILABLE LOCATION SERVICES

(75) Inventor: Leonid Sheynblat, Hillsborough, CA (US)

(73) Assignee: Qualcomm Incorporated, San Diego, CA (US)

( * ) Notice: Subject to any disclaimer, the term of this patent is extended or adjusted under 35 U.S.C. 154(b) by 208 days.

(21) Appl. No.: 10/651,574

(22) Filed: Aug. 29, 2003

(65) Prior Publication Data

US 2004/0160909 A1 Aug. 19, 2004

Related U.S. Application Data

(60) Provisional application No. 60/448,296, filed on Feb. 18, 2003.

(51) Int. Cl.
*H04Q 7/20* (2006.01)

(52) U.S. Cl. .............................. 455/456.1; 455/414.1; 455/456.2; 455/457

(58) Field of Classification Search ............. 455/456.1, 455/456.2, 456.3, 456.4, 456.5, 457, 414.2, 455/414.3
See application file for complete search history.

(56) References Cited

U.S. PATENT DOCUMENTS

| | | | | |
|---|---|---|---|---|
| 5,613,213 A | | 3/1997 | Naddell et al. ............ 455/54.1 |
| 6,321,092 B1 | * | 11/2001 | Fitch et al. ............... 455/456.5 |
| 6,968,195 B1 | * | 11/2005 | Nowak .................... 455/456.2 |
| 2003/0008619 A1 | | 1/2003 | Werner | |
| 2003/0036379 A1 | * | 2/2003 | Nikolai et al. ............. 455/414 |
| 2004/0185865 A1 | * | 9/2004 | Maanoja .................. 455/452.2 |
| 2005/0020276 A1 | * | 1/2005 | Maanoja et al. ......... 455/456.1 |

FOREIGN PATENT DOCUMENTS

| | | |
|---|---|---|
| EP | 1286558 | 8/2001 |
| EP | 1130933 | 9/2001 |
| WO | 0141468 | 6/2001 |
| WO | 03005750 | 1/2003 |

* cited by examiner

*Primary Examiner*—Erika A. Gary
(74) *Attorney, Agent, or Firm*—Philip Wadsworth; Bruce W. Greenhaus; Andrea L. Mays

(57) ABSTRACT

Techniques are disclosed for providing an indication of location service availability and the quality of available location services for a mobile station. A required location quality of service (LQoS) parameter is acquired. The required LQoS parameter may be a minimum position accuracy value, a maximum response time value, or a maximum age of position information value. An actual LQoS value is then determined. If the actual LQoS value does not satisfy the required LQoS parameter, then an indicator is provided that location services are not available for the mobile station. For example, a visual indicator may be displayed indicating that location services are not available. On the other hand, if location services are determined to be available, a relative strength measure of position accuracy is calculated and a visual indicator of the strength of the position accuracy is provided.

41 Claims, 6 Drawing Sheets

METHOD, APPARATUS, AND MACHINE-READABLE MEDIUM FOR PROVIDING INDICATION OF LOCATION SERVICE AVAILABILITY AND THE QUALITY OF AVAILABLE LOCATION SERVICES

RELATED APPLICATIONS

This application claims priority to U.S. Provisional Application No. 60/448,296, filed on Feb. 18, 2003.

FIELD

Embodiments of the invention relate generally to the field of location services for a mobile station, and more specifically to a method, apparatus, and machine-readable medium for providing an indication of location service availability and the quality of available location services for a mobile station.

BACKGROUND

Wireless networks for mobile communications include such examples as cellular telephone networks, broadband Personal Communication Services (PCS), wireless wide-area networks (WANs), wireless local-area networks (LANs), satellite communication systems, and two-way radio systems. These networks include mobile stations that may be telephone or radio handsets, vehicle-based transceivers, wireless data modems, or even semi-fixed units such as wireless local loop (WLL) stations. Many such networks also have an infrastructure including one or more base station units or access points whose locations are fixed and which communicate with the mobile stations and possibly also with each other and/or an external network. In a cellular telephone network, for example, the base station units provide an interface between the mobile stations and the public switched telephone network, communicate with registries to perform authentication, authorization and billing functions, and may also interact with each other to perform call management and handoff functions.

Certain wireless networks for mobile communications are augmented by adding the capability to locate the position of a particular mobile station. The Federal Communications Commission regulation (Docket No. 94-102, Third Report and Order adopted Sep. 15, 1999, released Oct. 6, 1999) requires all cellular carriers in the United States to be able to locate the position of a cellular telephone utilizing a handset-based technology making a 911 call within 50 meters for 67 percent of calls and within 150 meters for 95 percent of calls. Other uses for position location services include value-added user features such as mapping, routing and navigation and vehicle fleet management support.

Several different approaches for position location may be implemented. For example, terrestrial methods, satellite positioning system (SPS) methods, and hybrids of terrestrial and satellite-based methods may be utilized. One such satellite positioning system is the well-known Global Positioning System (GPS), which is a "constellation" of 24 well-spaced satellites that orbit the earth. The precise positions of the GPS satellites can be determined from different sets of information transmitted by the satellites themselves. Terrestial systems, such as cellular communication systems, utilize base stations of known locations that transmit signals. The amount of time required for the signals to travel from the satellites or base station transmitters to the mobile station may be measured and used to compute the distances (or ranges) between the transmitters and the mobile station. From these distances and the known locations of the transmitters, the location of the mobile station can be determined.

The Telecommunications Industry Association (TIA) has promulgated a recommended standard for the implementation of Location Services Enhancements for use in Wireless Radiotelephone Service. (TIA TR-45.2 PN-4747 Location Services Enhancements, Nov. 18, 2002, to be published as TIA/EIA/IS-881). The TIA Location Services Enhancements standard specifies intersystem operations to enable a wireless network to provide enhanced location services.

The TIA Location Services Enhancements standard sets forth guidelines for allowing a location services (LCS) client to specify the quality of service (QoS) required for location related tasks. The LCS client is defined as entity which interacts with a wireless network for the purpose of obtaining location information for one or more mobile stations within a set of parameters, such as location QoS (LQoS) parameters. The TIA Location Services Enhancements standard also sets forth proposed ways to prevent the location determination from taking place if the LQoS cannot be met. The TIA Location Services Enhancements standard additionally sets forth that a position estimate may not be returned to the LCS client if the position estimate does not meet the requested LQoS.

Wireless networks, wireless network operators and/or service providers may choose to provide many different types of location services and may deploy various selected technologies to support these services. Unfortunately, there are presently no means to indicate the quality of an available location service to the user of a mobile station. In fact, there is currently no means to indicate to the user whether location services are even available. Therefore, unless there is a mandate or a global decision to support certain types of location services, a mobile user roaming to a different network may not know whether location services are available and supported by a visited network or the quality of the location service that may be available and supported at a particular geographic location and time, be that in a home or visited wireless network.

There is therefore a need in the art for a method, apparatus, and machine-readable medium to provide an indication of location service availability and the quality of the available location service.

SUMMARY

A method, apparatus, and machine-readable medium to provide an indication of location service availability and the quality of the available location service for a mobile station are described herein. A required location quality of service (LQoS) parameter is acquired. For example, the required LQoS parameter may be a minimum position, velocity and/or time accuracy value, a maximum response time value, minimum or maximum information update rate values, a maximum age of position information value, or any combination of the above or other parameters. An actual LQoS value is determined. It is then determined whether the actual LQoS value satisfies the required LQoS parameter. If the actual LQoS value does not satisfy the required LQoS parameter, then an indicator is provided that location services are not available for the mobile station for the required LQoS. For example, a visual indicator may be displayed upon a display device of the mobile station.

If the actual LQoS value satisfies the required LQoS parameter, an actual parameter value such as position accuracy may be estimated. Further, a relative strength measure of position accuracy based on the actual position accuracy value estimate may be calculated, and an indicator of the relative strength measure of position accuracy may be provided. A visual indicator of the relative strength measure of position accuracy may be displayed upon a display device of the mobile station.

DETAILED DESCRIPTION

Various exemplary embodiments will be described in detail. Although numerous details are described to provide a thorough understanding of the exemplary embodiments, these specific details are not required in order to practice the exemplary embodiments. Details such as, well-known methods, types of data, protocols, procedures, components, electrical structures and circuits, are not described in detail, or are shown in block diagram form, in order not to obscure the exemplary embodiments.

Figure 1:
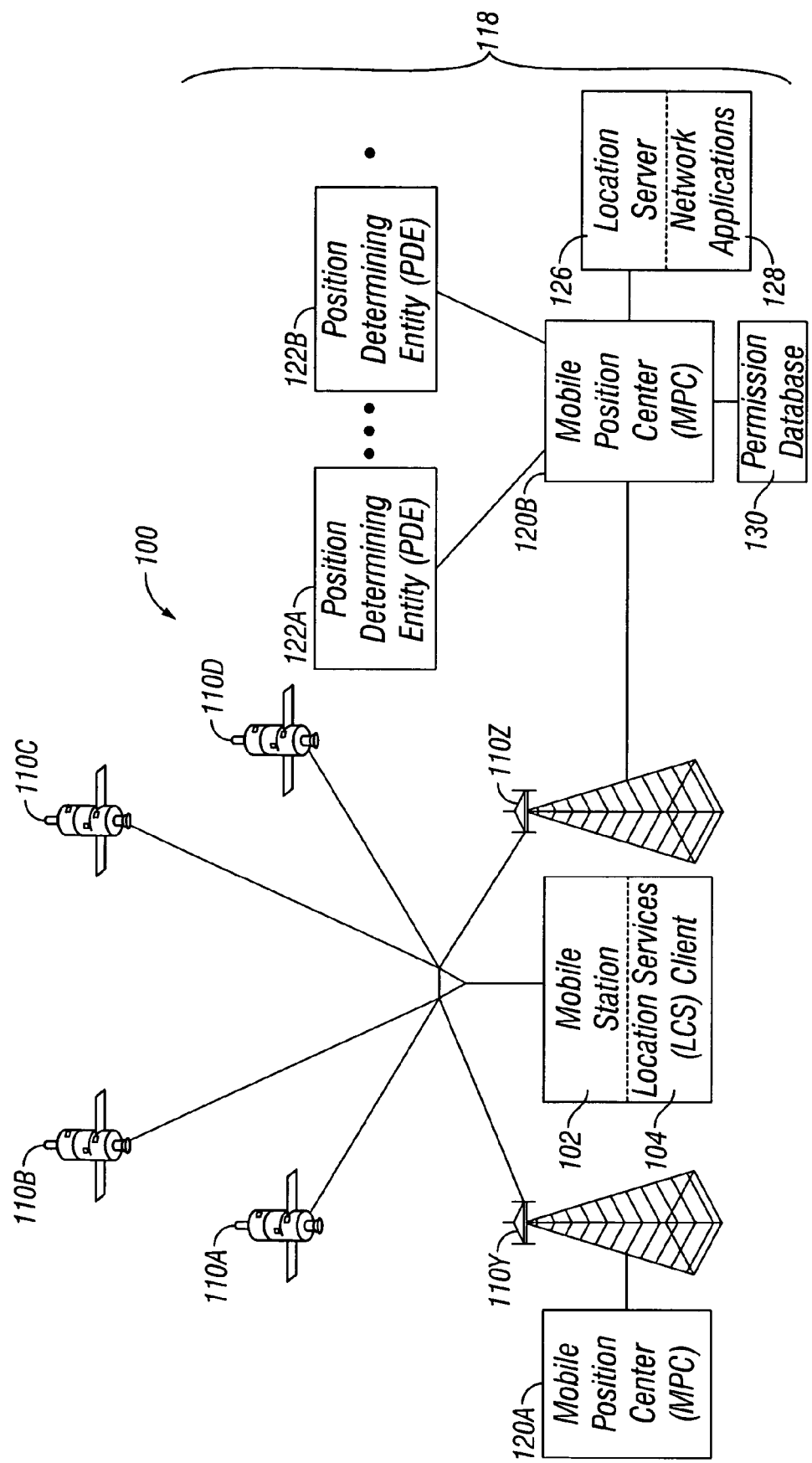
FIG. 1 is a block diagram illustrating a wireless communication network.

FIG. 1 is a block diagram illustrating an example of a wireless communication network 100. A mobile station 102 that is to be located receives signals transmitted from a plurality of transmitters 110A–D and 110Y–Z. Transmitters 110 may be transmitters having locations that are known or that can be ascertained. Transmitters 110 may include satellites of a satellite positioning system (SPS), such as transmitters 110A–D. Transmitters 110 may include terrestrial ground-based transmitters, such as transmitters 110Y and 110Z, which may be base stations. Mobile station 102 may receive signals from a combination of satellites or ground-based transmitters or both. Each of the terrestrial ground-based transmitters, such as transmitters 110Y and 110Z may be coupled to mobile position centers (MPCs) 120A and 120B, respectively. Typically, at least one group of transmitters will be coupled to an MPC. Mobile position centers 120A and 120B serve as interfaces or gateways to components of the network that are used for position determination and provisioning of location services.

Mobile station 102 may be any device capable of determining the arrival times of received signals with respect to a reference time. Other types of positioning methods utilizing ranging, timing or signal strength measurements may be used as well. For example, mobile station 102 can be a cellular telephone, a computer terminal having a wireless modem, a personal digital assistant, a stand-alone SPS receiver, or a receiver capable of receiving signals from ground-based transmitters.

A location services (LCS) client 104 is shown as being included as part of the mobile station 102. Generally, an LCS client 104 is an entity (e.g., a service control function) that interacts with the wireless network 100 for the purpose of obtaining position information for one or more mobile stations within a set of specified parameters, such as location quality of service (LQoS) parameters.

The LCS client 104 may also be present at other locations and may service one or more mobile stations. LCS clients subscribe to location services provided by the wireless network 100. Various network or third party components may serve as LCS clients. The subscription allows the LCS client 104 to obtain position information for the mobile station and provide location-based applications to the user of the mobile station 102. The LCS client 104 may also be responsible for formatting and presenting data and managing the user interface of the mobile station 102. In one example, the LCS client may be a downloadable application provided at the time of service subscription.

The position of mobile station 102 as well as the accuracy of the position estimate may be estimated based on signals received at the mobile station and the locations of the transmitters from which the received signals originated. The estimated position of the mobile station 102 and the accuracy of the position estimate may also be based, in part, on a signal transmitted by the mobile station 102 and received at one or more base stations. Thus, a combination of measurements for signals received at or transmitted by the mobile station 102 may be used to estimate the position and the associated position accuracy of the mobile station 102.

Further, a position network 118 may be utilized to aid in providing location services to mobile station 102. Mobile station 102, including a location services (LCS) client 104, can be coupled through the wireless network 100 to mobile position center (MPC) 120B. The MPC 120B serves as the point of interface to the position network 118. MPC 120B may be coupled to a transmitter 110Z to communicate through the wireless network 100 to mobile station 102.

The position network 118 may include the MPC 120B, position determining entities (PDE's) 122A and 122B, a location server 126, and a permission database 130.

The MPC 120B serves as an entity to retrieve, forward, store, and control position information for the mobile station 102. For example, MPC 120B may select a position determining entity (PDE) 122A, 122B, etc., to use in position determination and to forward position estimate and position estimate accuracy information to the requesting LCS client or to store the position estimate and position estimate accuracy information for subsequent retrieval. Additionally, MPC 120B may restrict access to position information for a mobile station 102 dependent upon the security and/or authorization procedures of the wireless network 100.

For example, a PDE 122, selected by MPC 120B, can facilitate the determination of a position estimate of a mobile station 102 and the position accuracy associated with the position estimate. The PDE 122 may be co-located with or may be physically separate from the MPC 120B. Multiple PDE's 122 may serve the same coverage area of an MPC, and multiple PDE's 122 may serve the same coverage area of an MPC utilizing different position determining technologies. In an alternative embodiment, the mobile station 102 may select the PDE.

The location server 126 can operate position-related network applications 128 for use by a mobile station 102. Examples of these position-related types of network applications include navigation and/or mapping functions such as digital maps upon which the position of the mobile station and routes can be plotted for user requested types of businesses, restaurant, stores, etc.; weather information for particular areas dependent upon the position of the mobile station; etc.

The position network 118 may include a permission database 130 which may be used to store the types of privileges, levels of service, etc., that are associated with particular LCS clients 104 and mobile stations 102. The permission database 130 may be used to authorize or reject requests for position-based information from requesting LCS clients 104. Furthermore, the position network 118 may be responsible for managing the security and/or authorization procedures for location services of the wireless network 100.

Estimates of the position of mobile station 102 and the accuracy of the position estimate may be derived by the mobile station 102, mobile position centers (MPCs) 120A and 120B with or without the help of position determining equipment (PDE), a base station, a wireless access point or some other entity. The entity performing the position estimation is provided with a set of measurements (hereafter referred to as an "Actual Measurement Vector") and for some methods with the locations of the transmitters (hereafter referred to as "Transmitter Position Estimates") or the means to determine these locations.

The Transmitter Position Estimates for SPS satellites 110A–D may be ascertained by processing the signals transmitted by the satellites. Each satellite transmits "Almanac" information, which includes information regarding the coarse location of all satellites in the "constellation". Each satellite further transmits "Ephemeris" information, which includes a higher accuracy version of its own orbit, as tracked and reported by tracking stations on earth. The Transmitter Position Estimates for the base stations may be made known to the entity performing the position estimate for the mobile station 102. For example, the mobile station 102 may include a database or means for acquiring the Transmitter Position Estimates for the base stations. Alternatively, these Transmitter Position Estimates may be provided by a PDE, or the PDE may have the Transmitter Position Estimates for the base stations.

The Actual Measurement Vector for SPS satellites 110A–D may also be ascertained by processing the signals transmitted by the satellites. Each satellite transmits a code (e.g., for GPS satellites it is referred to as a pseudorandom Gold code uniquely identifying each satellite), which can be correlated with a locally generated copy of this code to derive a time of arrival (code phase) of a satellite signal.

Transmitters 110 can be used as reference points to determine the position of the mobile station 102. By accurately measuring the distances to three transmitters 110 at known locations, the position of the mobile station 102 can be determined by "trilateration". The distance to each transmitter can be determined by measuring the time it takes for a signal to travel from the transmitter to the mobile station 102. If the time the signal is transmitted from the transmitter is known (e.g., stamped into the signal), then the travel time of the signal can be determined by observing the time the signal is received by the mobile station 102 based on the internal clock of the mobile station 102. This is one example of how position location for a mobile station can be accomplished.

In another example the reception of a signal from a single local area transmitter (such as Bluetooth, Wi-Fi, etc.) may be sufficient to determine the position location for a mobile. Various known algorithms can be used to determine the position of the mobile station 102 based on knowledge of the Transmitter Position Estimates and/or the Actual Measurement Vector. Further, various known algorithms may also be utilized to determine the accuracy of the position estimate of the mobile station 102.

Figure 2:
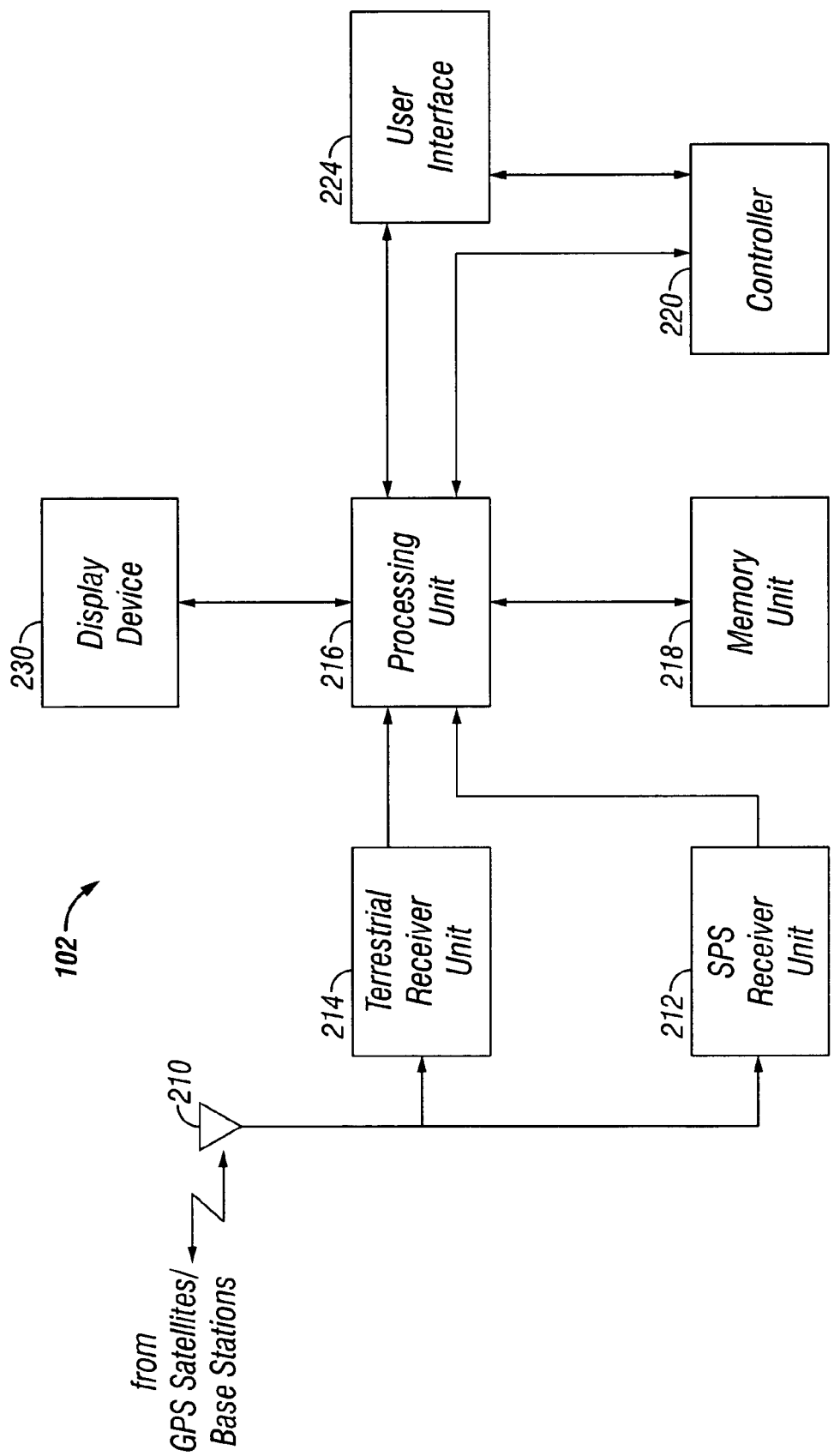
FIG. 2 is a simplified block diagram of a mobile station.

FIG. 2 is a simplified block diagram of a mobile station 102. Mobile station 102 may be designed with the capability to process signals from SPS satellites (such as GPS satellites), WAAS (wide area augmentation system) satellites or other position location satellites), terrestrial ground-based transmitters (e.g., cellular base stations, wireless access points, Loran stations, digital or analog TV towers, wireless beacons, etc.), or both. Mobile station 102 can include an antenna 210, a terrestrial receiver unit 212, a SPS receiver unit 214, a processing unit 216, a memory unit 218, a controller 220, a user interface 224, and a display device 230.

Antenna 210 receives signals from transmitters and couples the received signals to terrestrial and SPS receiver units 212 and 214. In another embodiment, separate antennas may be used.

Terrestrial receiver unit 214 includes front-end circuitry (e.g., radio frequency (RF) processing circuitry and/or other receiving circuitry) that processes signals transmitted from base stations and other terrestrial stations to derive information used for position determination and position determination accuracy. SPS receiver unit 212 includes front-end circuitry that processes signals transmitted from SPS satellites to derive information used for position determination and position determination accuracy. Such information from receiver units 212 and 214 may include timing information, signal quality information, the identities and locations of the transmitters whose signals are received, and possibly other information. In an alternative embodiment, the front-end circuitry may be shared by the receiver units.

The information from receiver units 212 and 214 is provided to processing unit 216. The processing unit 216 determines position estimates and position accuracy values.

Mobile station 102 may communicate with various MPCs and PDE's, which may assist in determining the position estimate and position accuracy values for the mobile station 102. In this case, the PDE alone, or in conjunction with the mobile station 102, may perform computations to derive the position estimate, position accuracy value, as well as other values. In the example when the position estimate and position accuracy value are determined in the position network 118, this information can be provided to the mobile station 102. Also, the PDE or other position network entity may provide certain information used to determine the position estimate and position accuracy values by the mobile station 102, for example, information indicative of the location of the SPS satellites and/or base stations, accuracy of the corresponding measurements, etc.

Memory unit 218 stores various data required for determining position estimates and position accuracy values. For example, memory unit 218 may store Almanac and/or Ephemeris information that indicates where each of a number of SPS satellites are located in their respective orbits at any given time. The satellite locations may be derived from the Almanac and Ephemeris or from other information obtained by SPS receiver unit 212 from signals transmitted from the satellites or by terrestrial receiver unit 214 from signals transmitted from the terrestrial transmitters. Memory unit 218 may also store previously determined position estimates and position accuracy values.

Controller 220 may receive signaling and/or intermediate results from processing unit 216 and may direct the operation of the processing unit. For example, controller 220 may select the particular types of signals to be processed. The signals may be satellite, terrestrial, or both; the particular algorithm to be used; the parameter values to be used for the selected algorithm; etc.

When the SPS signals are processed, the processing unit 216 may periodically instruct the SPS receiver unit 212 to acquire satellite signals. This signal acquisition process may be useful for maintaining a "warm state", time maintenance (in a synchronous wireless systems), and for LCS quality of service (LQoS) determination and indication, as will be discussed. When a minimum number of satellites have been acquired, a determination can be made as to the LCS quality of service (LQoS). For example, satellite signal levels which are related to the pseudo-range errors) scaled by a suitable satellite geometry factor (e,g., horizontal dilution of precision (HDOP)) may be used to provide a reasonable indication of the position accuracy value of the estimated position.

Position and position accuracy estimates can also be computed via a least squares, weighted least squares, Kalman filter, maximum likelihood or any other algorithm. In another example, position and position accuracy estimates can be determined via extrapolation of a position estimate with a velocity estimate and other rate of change terms. The age, related to the time of computation, of the original position estimate is essential for this computation. Position accuracy values can be computed in a similar fashion.

The assistance information needed for satellite acquisition can be easily derived from the satellite almanac information and the approximate location. For example, the satellite locations may be ascertained based on stored Almanac and/or Ephemeris information. The approximate location can be derived from various sources including mobile station-based sources. For hybrid technologies, the above process would also include terrestrial measurements such as pilot phase measurements in the wireless network.

The mobile station 102 may further include a user interface 224 (e.g. a keypad, dedicated buttons, a touch-screen, a microphone, etc.) to receive input from a user and a display device 230 to display information to a user. In one example, user interface 224 may be used for provisioning the LCS QoS. The user interface 224 allows a user to provide inputs to affect measurement selection and to set the location quality of service parameters.

Display 230 and user interface 224 may be used for notification and verification whereby the LCS QoS parameters can be indicated to the user and the user may verify that the displayed QoS is acceptable or not acceptable for the service desired. For example, the display of the age of the position estimate can be used by the user to assess if the position information is too old and is not applicable any more. Therefore, a user can request a new position estimate computed. In one embodiment, accuracy estimates are determined together with the position estimate. The time of the position estimate determination can also be used to determine the LCS QoS.

Figure 3:
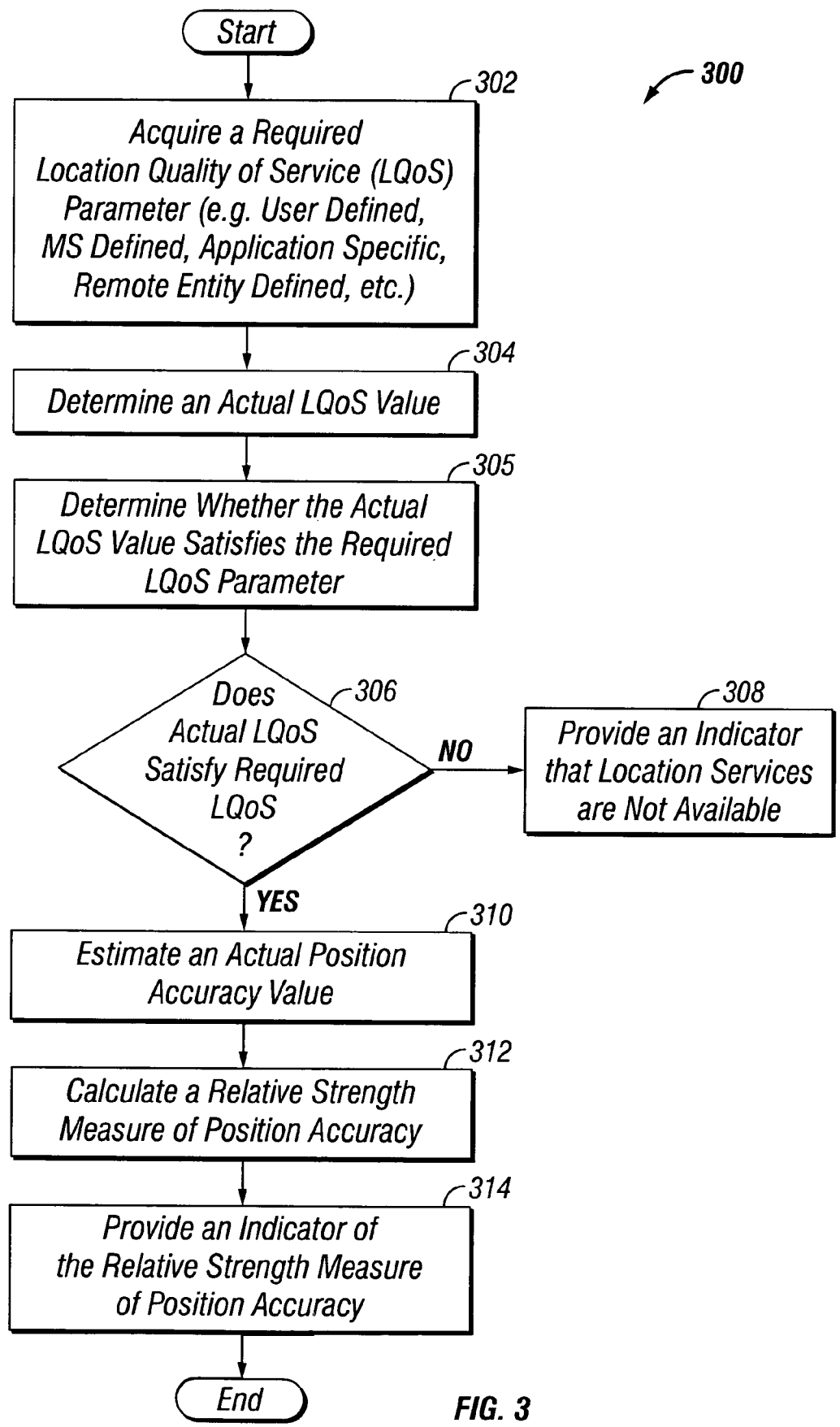
FIG. 3 is a flow diagram illustrating a process for providing an indication of the quality of location services for a mobile station.

FIG. 3 is a flow diagram illustrating a process 300 for providing an indication of quality of location services for a mobile station. At least one required location quality of service (LQoS) parameter is acquired (block 302). Generally, LQoS parameters relate to a set of parameters associated with a request for the position of a mobile station. The required LQoS parameters may include a minimum position accuracy value (e.g., a horizontal position accuracy value, a vertical position accuracy value, etc.), a velocity accuracy value, a time accuracy value, a maximum response time value, minimum or maximum information update rate values, a maximum age of position information value, or any combination of these or other parameters. Also, other LQoS parameters can be used that relate to other attributes, such as security and privacy settings. Different services may require different required levels of position accuracy, response time, and age of position information.

The position estimates of a mobile station 102, and the position accuracy values associated with the position estimates (also referred to as error estimates), may be determined utilizing a variety of methods, such as terrestrial methods, satellite positioning methods, and hybrids of terrestrial and satellite methods, utilizing a mobile station 102 by itself, or in conjunction with the components of a position network 118.

A minimum LQoS position accuracy value corresponds to the minimum value of position accuracy (e.g. maximum position error estimate) that is acceptable to satisfy the required LQoS. A maximum LQoS response time value corresponds to the maximum amount of time that can pass before obtaining a position accuracy value that is acceptable to satisfy the require LQoS. A maximum LQoS age of position information value corresponds to the maximum age of the position information that is acceptable to satisfy the required LQoS.

The required LQoS parameters may be user-defined, mobile station defined, application-specific, or remote-entity defined. In the case of user-defined required LQoS parameters, a user of a mobile station 102 may control the required LQoS parameters by accessing the quality of LCS services set-up made available to the end-user via the user interface 224 of the mobile station 102. As an example, a user may set user-defined required LQoS parameters such that the required LQoS position accuracy is always within at least 25 meters and the position estimate must not be older than 2 minutes. On the other hand, the required LQoS parameters may be defined by the mobile station 102 itself. The mobile station 102 may be preprogrammed or provisioned with default required LQoS parameters. The user may also modify the current LQoS settings.

The required LQoS parameters may also be application-specific, wherein the application is resident on the mobile station 102 and/or the location server 126. For example, a mapping/navigational application may be resident on the location server 126 to provide a digital map to the mobile station 102, which is displayed upon the display device 230 of the motile station. The digital map can show the position of the mobile station relative to a mapped area and a route to a user requested location. For example, the application may require a LQoS position accuracy of at least 15 meters and a maximum response time of 15 seconds. The required LQoS parameters may also be defined by a remote-entity such as a mobile position center 120, a position determining entity 122, or a location server 120.

In another example, the user may be provided with a downloaded location-sensitive application such as a BREW or Java downloadable application.

The required LQoS parameters may also be determined based on information associated with a particular location-sensitive application such as an application related to routing, weather, mapping, body finder, emergency service, roadside assistance, etc.

Once a required LQoS parameter is acquired, a corresponding actual LQoS value is determined (block 304). It is then determined whether the actual LQoS value satisfies the required LQoS parameter (block 305). If the actual LQoS value does not satisfy the required LQoS (decision block 306) then an indicator is provided to the user of the mobile station that location services of the required LQoS are not available (block 308).

For example, assuming the mapping/navigational application requires a minimum LQoS position accuracy value of at least 15 meters and the actual LQoS position accuracy value can only be determined to an uncertainty of 50 meters, then an indicator is provided to the user of the mobile station 102 that location services of the required LQoS are not available. Multiple required LQoS parameters can also be utilized in conjunction with multiple corresponding actual LQoS values. For example, a minimum LQoS position accuracy value of at least 15 meters in conjunction with a maximum response time of 15 seconds may be required to provide sufficient LQoS for location services.

In addition, in the example when multiple LQoS parameters are utilized, priorities can be assigned to these parameters to indicate the importance of one parameter relative to another. Tolerances can also be assigned. Continuing with the above example, a minimum LQoS position accuracy of at least 15±3 meters, with high priority, in conjunction with a maximum response time of 15±5 seconds, with medium priority, may be required to provide sufficient LQoS for location services. It should be appreciated that various implementations and methods can be used to assign tolerances and priority values to required LQoS parameters.

In certain instances the required LQoS parameters cannot be obtained due to the type of radio-location technology being employed to provide the position estimates. As an example, if only terrestrial cell-ID based positioning is available and the minimum LQoS position accuracy parameter value is set to 25 meters (which cannot be obtained with terrestrial cell-ID based positioning), then automatically an indicator is provided to the user of the mobile station that location services of the required LQoS are not available.

If the wireless network 100 does not support location services at all, then an indicator is provided to the user of the mobile station 102 that location services are not available. In one embodiment, this indicator may be different from the indicator that the location services of the required LQoS are not available.

As the mobile station roams from one network to another, an indicator can be automatically updated to reflect services availability in the current network. In one example, the quality of services can also be automatically updated. An update procedure (the update rate, update on request or change, etc) can be provisioned with the service or may be managed by the user, LCS client, or position network elements.

In one example, the services supported by the network have the associated required quality of service. In another example, the display of the service availability status and quality of service indicators is managed via the subscriber information, services registry, position network entity or entities, user profile or user input. In one particular example, only the services available in the visited network are automatically updated and displayed to the user of the mobile station. A mobile positioning center 120 of wireless network 100 may be used to manage the location services (authorization, authentication, etc.) and the required quality of service.

Figure 4:
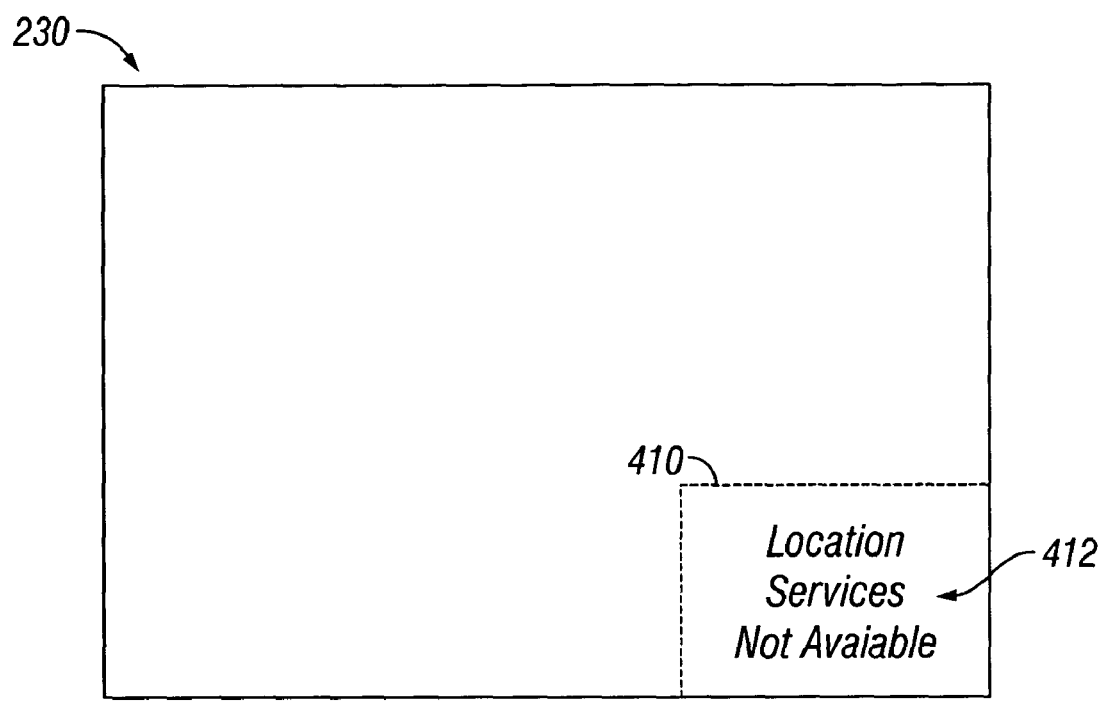
FIG. 4 is a diagram illustrating a visual indicator to alert the user of a mobile station that location services are not available.

A visual indicator may be displayed to the user of the mobile station that location services are not available. FIG. 4 is a diagram illustrating an example of a visual indicator 410 to alert the user of a mobile station that location services are not available. In this example, a visual indicator 410 including the words "Location Services Not Available" 412 may be displayed on the display device 230 of a mobile station 102 to alert the user that location services are not available. A wide variety of words, icons, etc. may be utilized to perform this function. Other sorts of indicators may also be used, such as audio indicators.

The indicator and the logic for displaying the indicator may be either provisioned with the service or downloaded to the mobile station. In one example, the indicators and the logic for displaying the indicators is provided and managed by a particular location application. For example, a location services application may include the means to compute, process and indicate the status and quality of service to the user of the mobile station.

On the other hand, if the actual LQoS value satisfies the required LQoS parameter value (decision block 306), then an actual position accuracy value may be determined (block 310). If the only required LQoS parameter(s) used to determine whether location services are available was a maximum response time, a maximum age of the last position value, or another type of required LQoS parameter, or combinations thereof (i.e., not including position accuracy), then an actual position accuracy value needs to be estimated. However, if one of the required LQoS parameters to determine whether location services should be available was position accuracy, then that value may be initially used in the following process.

Based on the estimated actual position accuracy value, a relative strength measure of position accuracy is calculated (block 312). This relative strength measure of position accuracy may be the ratio of the actual position accuracy value vs. an ideal position accuracy value, such as: "zero" meters (e.g., 100% accuracy), five meters (e.g. 90% accuracy), etc. In other words, an error of zero meters can define an ideal accuracy. The ratio can also be determined with respect to the required, provisioned or user provided value or a combination thereof.

Based on this relative strength measure of position accuracy, an indicator of the relative strength measure of position accuracy can be provided to the user of the mobile station (block 314). In this way, an indicator of the quality of location services is provided to the user. Further, once it has been determined that location services are available, the relative strength measure of position accuracy can be periodically updated based on additional estimated actual position accuracy values.

The indicator may take many different forms. For example, a visual indicator of the relative strength measure of position accuracy, such as a graphical representation, can be displayed upon the display device of the mobile station. However, a wide variety of words, icons, graphs, etc. may be utilized to perform this function. Other sorts of indicators may also be used, such as audio indicators.

Figure 5:
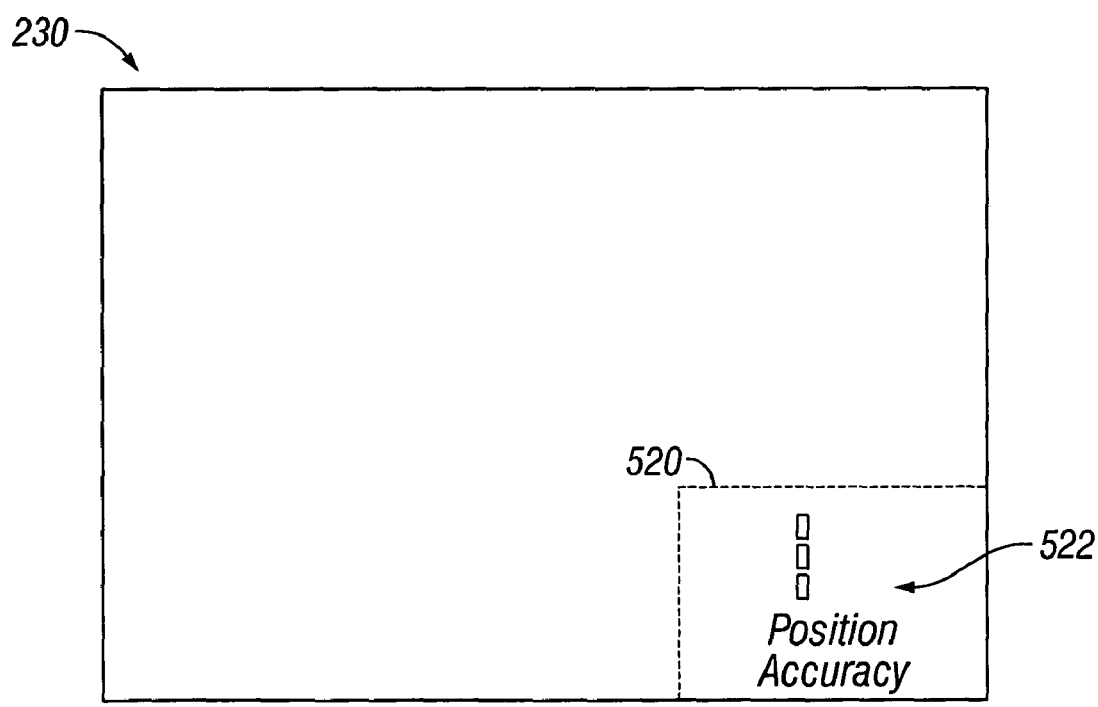
FIG. 5 is a diagram illustrating one example of a visual indicator including a vertical bar graph representation of the relative strength of the positioning accuracy for a mobile station.

FIG. 5 is a diagram illustrating one example of a visual indicator that includes a vertical bar graph representation of the relative strength of the position accuracy for a mobile station. Visual indicator 520 includes a vertical bar graph representation 522 that may be displayed upon the display device 230 of the mobile station. The vertical bar graph 522 indicates to the user the relative strength of the position accuracy associated with the position estimate of the mobile station.

If only one bar is present the user is alerted that a relatively low level of position accuracy is available to the mobile station, if three bars are present the user is alerted that a relatively above-average level of position accuracy is available to the mobile station, whereas if all four bars of the vertical graph are present the user is alerted that the maximum level of position accuracy is available to the mobile station. In another example, the relative strength of the position accuracy can indicate the relationship between the required and the actual LQoS values, such as the actual value not meeting, meeting or exceeding the required value. Tolerances for the relative strength measures can also be used to determine the relationship.

Figure 6:
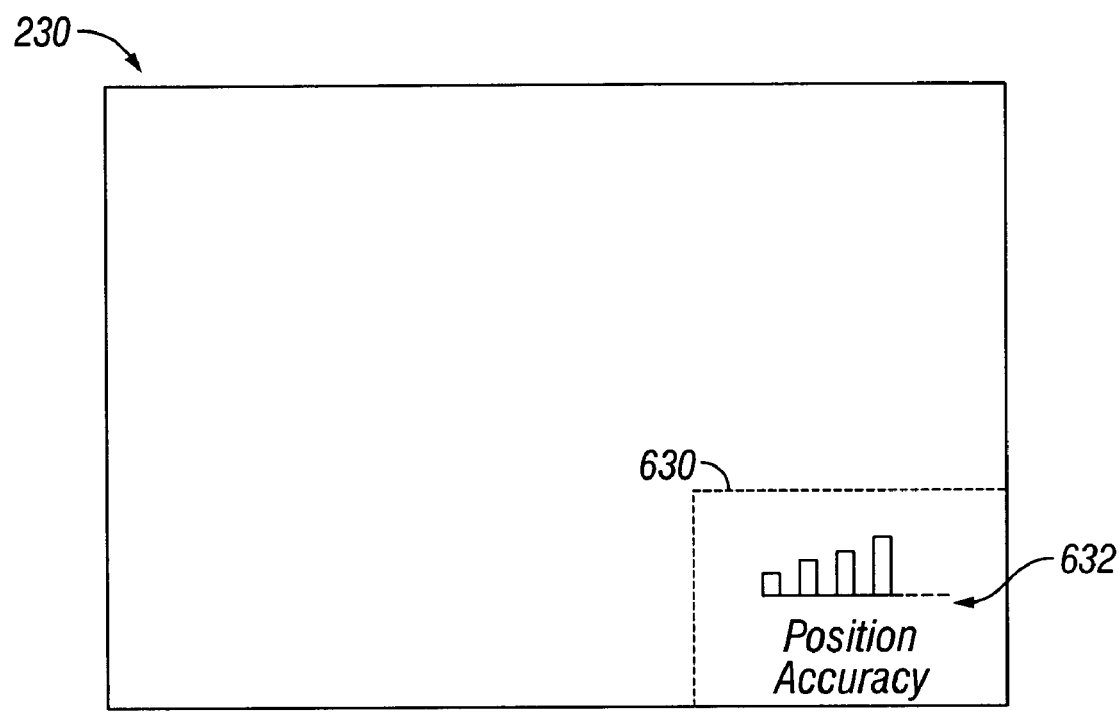
FIG. 6 is a diagram illustrating a visual indicator including a histogram graph representation of the relative strength of the positioning accuracy for a mobile station.

FIG. 6 is a diagram illustrating another example of a visual indicator that includes a histogram graph representation of the relative strength of the position accuracy for a mobile station. Visual indicator 630 includes a histogram graph representation 632 that may be displayed upon the display device 230 of the mobile station. The histogram graph 632 indicates to the user the relative strength of the position accuracy associated with the position estimate of the mobile station. If only one bar is present the user is alerted that a relatively low level of position accuracy is available to the mobile station, if four bars are present the user is alerted that a relatively above-average level of position accuracy is available to the mobile station, whereas if all six bars of the histogram graph are present the user is alerted that a maximum level of position accuracy is available to the mobile station.

Figure 7:
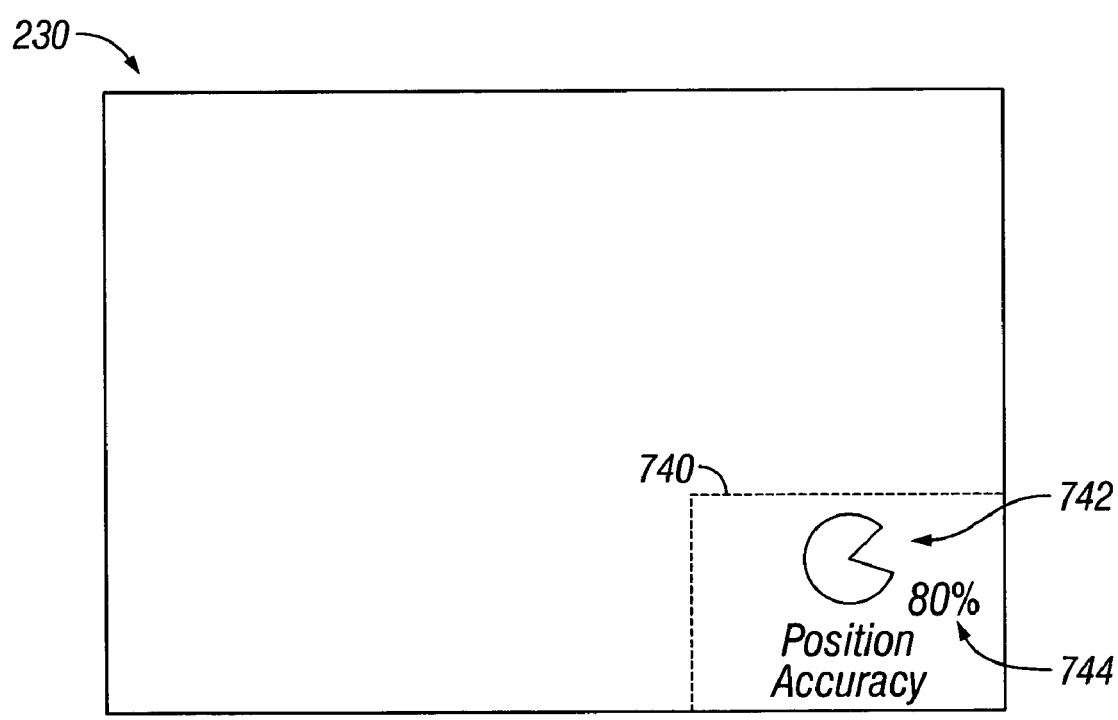
FIG. 7 is a diagram illustrating a visual indicator including a pie graph representation of the relative strength of the positioning accuracy for a mobile station.

FIG. 7 is a diagram illustrating another example of a visual indicator that includes a pie graph representation of the relative strength of the position accuracy for a mobile station. A visual indicator 740 includes a pie graph representation 742, along with a percentage indicator 744, which may be displayed upon the display device 230 of the mobile station to indicate to the user the relative strength of the position accuracy. In this example, the user is alerted that a relatively high level of position accuracy is available to the mobile station at an approximate 80% relative strength.

Although the above are particular examples of graphical representations of measures of position accuracy, a wide variety of other types of graphical representations, words, icons, etc., may be displayed to perform this function. Other sorts of indicators may also be used as well.

As an example, an age of the position information can be displayed as an integer or a set of integers indicating the number of seconds, minutes, hours, days or a combination of the above values since the last position or a set of previously computed positions. The values and the corresponding indicators can be refreshed periodically, on the change of a select value, or upon a request.

A history of service availability and quality of service may also be indicated to the user as a function of time (1 minute ago, 5 minutes ago, 10 minutes ago, etc), location (home, office, point of interest, today's destinations, stored waypoints, etc), some other parameter, or a combination thereof. This information, for example, can be used by the user of the mobile station to select the position information previously computed for a location service or direct the user to the location where a desired quality of service can be provided. For a more sophisticated user, an indication of the location technology used (e.g. satellite method such as GPS, terrestrial method such as AFLT, EOTD, UTDOA, cell-ID or a combination thereof) can also be provided.

The mobile station 102 of FIG. 2 under the control of the processing unit 216 alone, and/or in conjunction with the position determination network 118, may implement aspects of the process 300 of FIG. 3.

Figure 8:
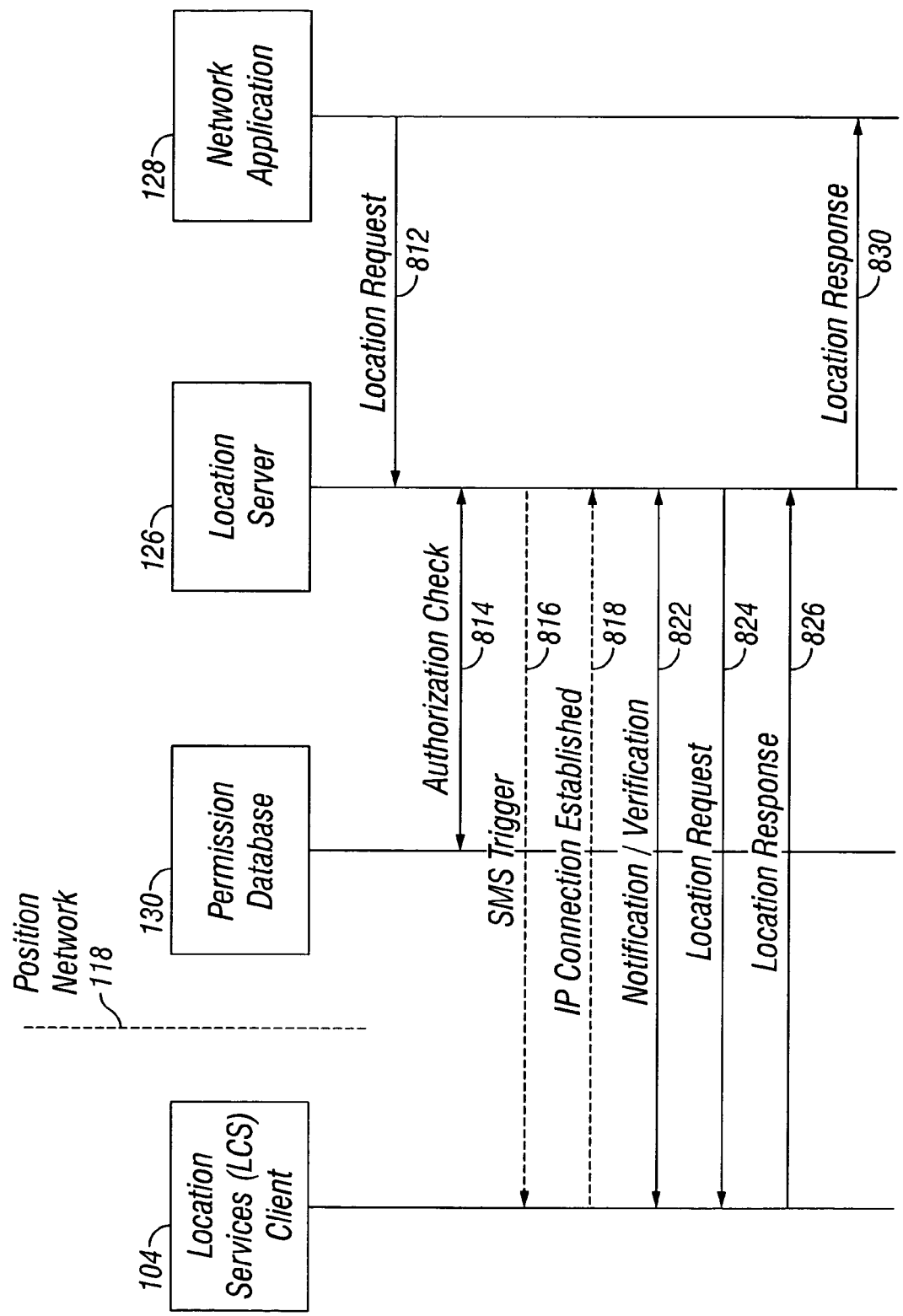
FIG. 8 is a diagram illustrating an example of the data flow between various components of the wireless network during a location services request.

FIG. 8 is a simplified diagram illustrating an example of the data flow between various components of the wireless network during a location services request. A location services (LCS) client 104 communicates through the wireless network 100 with the position network 118 that in one exemplary implementation includes a network application 128, a location server 126, and a permission database 124 (see FIG. 1). The LCS client 104 may be included in a mobile station 102. In order to simplify the description of the data flow it will be assumed that the LCS client 104 would like to use a mapping/navigation network application 128 logically resident on the location server 126 to determine its location relative to, and a route to, a desired place of interest to which the user of the LCS client 104 would like to go to. For example, a user may wish to find a route to the nearest STARBUCKS Coffee Shop. This information being presented on a digital map displayed on the display device 230 of the mobile station 102 to the user.

Based on the request from the LCS client 104 to display the mobile station's location on the map, the location of the nearest STARBUCKS coffee shop on the map, and the shortest route thereto, the network application 128 makes a location services request 812 to the location server 126. In one example, the routing information can be provided via voice commands. The location server 104 is an entity of the position network 118 that performs or assists the computational functions and may logically include or be coupled to a position determining entity (PDE). If the location server 126 is in an assist mode, the mobile station or some other entity may perform the computational functions.

The location server 126 first performs an authorization check 814 with the permission database 130 in order to authenticate the LCS client 104 and to authorize the LCS request from the LCS client 104. The authorization check is performed to determine whether the LCS client 104 is authorized to receive this service. The permission database 130 may include a list of LCS client subscribers and what services and quality of services each LCS client subscriber is authorized to receive.

Assuming that the LCS client 104 is authorized to receive the mapping service, the location server 126 next can optionally send a short message service (SMS) trigger signal 816 to the LCS client 104 to indicate that a position location determination session is going to be initiated and to further notify the LCS client 104 as to what communications protocol will take be used.

A transmission control protocol/Internet protocol (TCP/IP) may be utilized. In return, the LCS client 104 establishes an IP connection 818 with the location server 126 on the position network 118 side.

In another example, a mobile station may already be connected to the wireless network and therefore steps 816 and 818 would not be required. In a further example, a mobile station may initiate and establish a communication with the wireless and position networks.

A notification/verification session 822 is then commenced. The LCS client 104 is notified that either it needs to provide its location to the position network 118 or that the position network 118 will determine the LCS client's 104 location. It is further verified with the LCS client 104 whether or not the position location determination session should proceed. The required quality of service may also be used during the notification/verification step. For example, the user may or may not be willing to provide the timely information of his/her whereabouts with the degree of accuracy contained in the LQoS.

Accordingly, the location server 126 makes a notification request 822 to the LCS client 104 to verify whether the LCS client 104 wishes the position location determination session to proceed. The LCS client 104 then responds with a verification response 822 to the location server 126 indicating whether or not it wishes to proceed with the position location determination session.

Assuming that the LCS client 104 wishes to proceed with a position location determination session, the position of the LCS client 104 is determined, as well as whether or not there is sufficient location quality of service (LQoS) to accommodate the requested service of the network application 128 by the LCS client 104. The location request 824 requests the position information with a required quality of service. The mobile station provides the requested information in the location response 826. The location response 830 is further forwarded to the network application 128.

The position estimate of the LCS client 104 and the position accuracy associated with the position estimate may be determined utilizing a variety of methods, such as terrestrial methods, satellite methods, and hybrids of terrestrial and satellite methods, utilizing the mobile station by itself, or in conjunction with the components of a position network 118, such as a PDE. Further, required location quality of service (LQoS) parameter(s) may be acquired, as previously discussed.

In the mapping example, a minimum LQoS position accuracy value may be required by the mapping network application 128. Based on the minimum required LQoS position accuracy value, it is determined whether the actual LQoS position accuracy value satisfies the required minimum LQoS position accuracy value. If the actual LQoS position accuracy value does not satisfy the minimum required LQoS position accuracy value, then an indicator is provided to the user of the LCS client 104 that location services are not available.

If the mapping network application 128 requires a minimum LQoS position accuracy value of 25 meters, but the LCS client 104 has only terrestrial location technology available for location determination that only has a position accuracy of 250 meters, then the request for the determination of the LCS client's 104 position relative to the nearest STARBUCKS, and a route to the nearest STARBUCKS coffee shop, would be denied by the mapping network application 128.

In the example when an LCS client 104 is logically associated with a mobile station 102, an indicator may be provided to the user of the mobile station 102 utilizing the LCS client 104 that location services of the required quality of service are not available. A visual indicator including the words "Location Services Not Available" or "Quality of Service Not Available" may be displayed on the display device 230 of the mobile station to alert the user that location services are not available (e.g. FIG. 4).

On the other hand, if the mapping network application 128 requires a minimum LQoS position accuracy value of 50 meters, and the LCS client 104 has access to the GPS based location technology that has an estimated accuracy of 20 meters, then the request for determination of the LCS client's 104 position relative to the nearest STARBUCKS, and a route to the nearest STARBUCKS coffee shop, would be accepted by the mapping network application 128. A map showing the position of the LCS client 104, the nearest STARBUCKS, and a route thereto would be sent to the LCS client 104. Accordingly, a digital map may be rendered on the display device 230 of the associated mobile station 102 showing this map to the user.

The minimum LQoS position accuracy, or some other required quality of service, does not have to be set by numeric parameters, but may be selected based on the type of application being utilized. Applications may be utilized that render city maps, park maps, display local weather maps for a region, locations of nearest STARBUCKS coffee shops, etc. As an example, if the LCS client 104 requests a network application 128 that displays city maps and the LCS client's 104 position can be determined with sufficient accuracy to be located in a particular city, the city map can be provided to the LCS client 104 by the network application 128 for display to the user. If the LCS client 104 can have its position determined with sufficient accuracy to be in a particular weather region, the current or forecasted weather map for that region may be provided to the LCS client 104 by the network application 128 for display to the user.

In another example, a user of the mobile station 102 associated with an LCS client 104 may request a service even if the actual quality of service does not meet the required quality of service. Although applications have been discussed as being resident on the location server 126, the applications may also, or instead of, may be resident on the LCS client 104 or the mobile station 102 itself.

The components of the mobile station 102 may be implemented as a digital signal processor (DSP), an application specific integrated circuit (ASIC), a processor, a microprocessor, a controller, a microcontroller, a field programmable gate array (FPGA), a programmable logic device, other electronic unit, or any combination thereof designed to perform the functions described herein.

While various functional components have been described in particular embodiments, it should be appreciated that the components can be implemented in hardware, software, firmware, middleware or a combination thereof and utilized in systems, subsystems, components, or sub-components thereof.

When implemented in software or firmware, instructions or code segments may be utilized to perform the necessary tasks. The instructions or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, bar codes, etc. The instructions or code segments may be downloaded via networks such as the Internet, Intranet, etc.

Although some examples have been described with reference to GPS satellites, it will be appreciated that the teachings are equally applicable to positioning systems that utilize pseudolites or a combination of satellites and pseudolites. Pseudolites are ground based transmitters that broadcast a PN code (similar to a GPS signal) modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites.

In the preceding discussion examples have been described with reference to application of the United States Global Positioning Satellite (GPS) system. It should be evident, however, that these methods are equally applicable to similar satellite positioning systems, and in, particular, the Russian Glonass and European Galileo systems. The Glonass system primarily differs from GPS system in that the emissions from different satellites are differentiated from one another by utilizing slightly different carrier frequencies, rather than utilizing different pseudorandom codes. The term "GPS" used herein includes such alternative satellite positioning systems (SPSs), including the Russian Glonass system.

Further, while examples have been described with reference to illustrative embodiments, these descriptions are not intended to be construed in a limiting sense. Various modifications of the illustrative embodiments, as well as other embodiments, should be apparent to those skilled in the art.

What is claimed is:

1. A method for providing an indication of whether the quality of location services for a mobile station is sufficient to provide location services, comprising:
    acquiring a required location quality of service (LQoS) parameter;
    determining an actual LQoS value;
    determining whether the actual LQoS value satisfies the required LQoS parameter; and
    providing a location services availability indicator based on said determination, said location services availability indicator providing an indication that location services are available prior to requesting location services when the actual LQoS value satisfies the required LQoS parameter.

2. The method of claim 1, wherein if the actual LQoS value does not satisfy the required LQoS parameter, further comprising providing an indicator that location services are not available for the mobile station.

3. The method of claim 2, wherein providing an indicator that location services are not available, further comprises displaying a visual indicator that location services are not available.

4. The method of claim 1, wherein the required LQoS parameter comprises one of a plurality of required LQoS parameters including a minimum position accuracy value, a maximum response time value, and a maximum age of position information value.

5. The method of claim 1, wherein if the actual LQoS value satisfies the required LQoS parameter, further comprising estimating an actual position accuracy value.

6. The method of claim 5, further comprising calculating a relative strength measure of position accuracy based on the actual position accuracy value estimate.

7. The method of claim 6, further comprising providing an indicator of the relative strength measure of position accuracy.

8. The method of claim 7, wherein providing an indicator of the relative strength measure of position accuracy, further comprises displaying a visual indicator of the relative strength measure of position accuracy.

9. The method of claim 8, wherein the visual indicator of the relative strength measure of position accuracy includes a graphical representation of the relative strength measure of position accuracy.

10. The method of claim 1, wherein the acquired required LQoS parameter is defined by the user of the mobile station.

11. The method of claim 1, wherein the acquired required LQoS parameter is acquired from the mobile station.

12. The method of claim 1, wherein the acquired required LQoS parameter is application-specific.

13. The method of claim 1, wherein the acquired required LQoS parameter is defined by a remote entity.

14. The method of claim 13, wherein the remote entity is a server.

15. The method of claim 13, wherein the remote entity is a part of a position network.

16. A mobile station to provide an indication of whether the quality of location services is sufficient to provide location services, comprising:
    a receiver unit to receive and process a plurality of signals from a plurality of transmitters; and
    a processor coupled to the receiver unit to:
        acquire a required location quality of service (LQoS) parameter;
        determine an actual LQoS value;
        determine whether the actual LQoS value satisfies the required LQoS parameter; and
        provide a location services availability indicator based on said determination, said location services availability indicator providing an indication that location services are available prior to requesting location services when the actual LQoS value satisfies the required LQoS parameter.

17. The mobile station of claim 16, wherein if the actual LQoS value does not satisfy the required LQoS parameter, the processor to further provide an indicator that location services are not available for the mobile station.

18. The mobile station of claim 16, wherein one of the plurality of signals received by the receiver unit includes the required LQoS parameter.

19. The mobile station of claim 16, wherein one of the plurality of signals received by the receiver unit includes the actual LQoS value.

20. The mobile station of claim 16, further comprising a display device, wherein, if the actual LQoS value does not satisfy the required LQoS parameter, the processor instructs the display device to display a visual indicator that location services are not available.

21. The mobile station of claim 16, wherein the required LQoS parameter comprises one of a plurality of required LQoS parameters including a minimum position accuracy value, a maximum response time value, and a maximum age of position information value.

22. The mobile station of claim 16, wherein if the processor determines that the actual LQoS value satisfies the required position LQoS parameter, the processor estimates an actual position accuracy value.

23. The mobile station of claim 22, wherein the processor further calculates a relative strength measure of position accuracy based on the actual position accuracy value estimate.

24. The mobile station of claim 23, wherein the processor provides an indicator of the of the relative strength measure of position accuracy.

25. The mobile station of claim 24, further comprising a display device, wherein the processor instructs the display device to display a visual indicator of the relative strength measure of position accuracy.

26. The mobile station of claim 25, wherein the visual indicator of the relative strength measure of position accuracy includes a graphical representation of the relative strength measure of position accuracy.

27. The mobile station of claim 16, wherein the acquired required LQoS parameter is defined by the user of the mobile station.

28. The mobile station of claim 16, wherein the acquired required LQoS parameter is acquired from a memory unit of the mobile station.

29. The mobile station of claim 16, wherein the acquired required LQoS parameter is application-specific.

30. The mobile station of claim 16, wherein the acquired required LQoS parameter is defined by a remote entity and communicated to the receiver unit by a transmitter.

31. The mobile station of claim 30, wherein the remote entity is a server.

32. The mobile station of claim 30, wherein the remote entity is a part of a position network.

33. A machine-readable medium having stored thereon instructions, which when executed by a machine, cause the machine to perform the following operations comprising:
    acquiring a required location quality of service (LQoS) parameter necessary to provide location services for a mobile station;
    determining an actual LQoS value;
    determining whether the actual LQoS value satisfies the required LQoS parameter; and
    providing a location services availability indicator based on said determination, said location services availability indicator providing an indication that location services are available prior to requesting location services when the actual LQoS value satisfies the required LQoS parameter.

34. The machine-readable medium of claim 33, wherein if the actual LQoS value does not satisfy the required LQoS parameter, further comprising instruction to cause the operation of providing an indicator that location services are not available for the mobile station.

35. The machine-readable medium of claim 34, further comprising instructions to cause the operation of displaying a visual indicator that location services are not available.

36. The machine-readable medium of claim 33, wherein the required LQoS parameter comprises at least one of a plurality of required LQoS parameters including a minimum position accuracy value, a maximum response time value, and a maximum age of position information value.

37. The machine-readable medium of claim 33, wherein if the actual LQoS value satisfies the required LQoS parameter, further comprising instructions to cause the operation of estimating an actual position accuracy value.

38. The machine-readable medium of claim 37, further comprising instructions to cause the operation of calculating a relative strength measure of position accuracy based on the actual position accuracy value estimate.

39. The machine-readable medium of claim 38, further comprising instructions to cause the operation of providing an indicator of the relative strength measure of position accuracy.

40. The machine-readable medium of claim 39, further comprising instructions to cause the operation of displaying a visual indicator of the relative strength measure of position accuracy.

41. The machine-readable medium of claim 40, wherein the visual indicator of the relative strength measure of position accuracy includes a graphical representation of the relative strength measure of position accuracy.

* * * * *